United States Patent [19]

Beguin et al.

[11] 4,257,910
[45] Mar. 24, 1981

[54] LIQUID CRYSTAL OF DIESTER TYPE EXHIBITING A SMECTIC PHASE, WITH LOW FREQUENCY OF DIELECTRIC ISOTROPY, AND DISPLAY DEVICE UTILIZING THIS CRYSTAL

[75] Inventors: Alain Beguin; Annie Zann; Jean-Claude Dubois, all of Paris, France

[73] Assignee: Thomson-CSF, Paris, France

[21] Appl. No.: 20,056

[22] Filed: Mar. 13, 1979

[30] Foreign Application Priority Data

Mar. 17, 1978 [FR] France .................... 78 07799

[51] Int. Cl.³ .......................... C09K 3/34; G02F 1/13
[52] U.S. Cl. ................................. 252/299; 252/408; 260/465 D; 350/346; 350/350 R; 350/350 S
[58] Field of Search ............... 252/299, 408; 350/350 R, 350 S, 346; 260/465 D

[56] References Cited

U.S. PATENT DOCUMENTS

| | | | |
|---|---|---|---|
| 3,915,883 | 10/1975 | Van Meter et al. | 252/299 |
| 3,953,491 | 4/1976 | Steinstrasser et al. | 252/299 |
| 4,009,934 | 3/1977 | Goodwin et al. | 252/299 |
| 4,073,742 | 2/1978 | Erdmann et al. | 252/299 |
| 4,090,975 | 5/1978 | Aldrich et al. | 252/299 |
| 4,110,243 | 8/1978 | Abert-Mellah et al. | 252/299 |
| 4,141,853 | 2/1979 | Hibino et al. | 252/299 |

FOREIGN PATENT DOCUMENTS

| | | | |
|---|---|---|---|
| 2715519 | 10/1977 | Fed. Rep. of Germany | 252/299 |
| 2752975 | 8/1978 | Fed. Rep. of Germany | 252/299 |
| 2836086 | 3/1979 | Fed. Rep. of Germany | 252/299 |
| 2400545 | 3/1979 | France | 252/299 |

OTHER PUBLICATIONS

Bucher, H. K., et al., Appl. Phys. Lett., vol. 25, No. 4, pp. 186-188 (1974).
Dubois, J. C., Ann. Phys., vol. 3, pp. 131-138 (1978).

*Primary Examiner*—Teddy S. Gron
*Attorney, Agent, or Firm*—Oblon, Fisher, Spivak, McClelland & Maier

[57] ABSTRACT

The invention concerns a substance of diester type, i.e. an organic compound with three benzene nuclei joined by —COO— groups, exhibiting at least one mesomorphic phase of smectic type.

The substance of the invention answers to the formula:

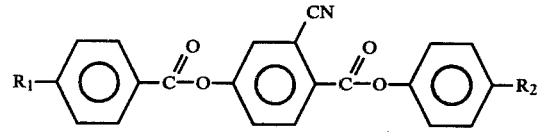

where $R_1$ is an alkyl or alkoxy radical and $R_2$ an alkyl. In the case where $R_1$ is an octyl and $R_2$ a pentyl there is a dielectric isotropy frequency of 30 kHz, i.e. a frequency where the dielectric anistropy changes sign.

Application to field-effect display devices with dual-frequency memory.

3 Claims, No Drawings

LIQUID CRYSTAL OF DIESTER TYPE EXHIBITING A SMECTIC PHASE, WITH LOW FREQUENCY OF DIELECTRIC ISOTROPY, AND DISPLAY DEVICE UTILIZING THIS CRYSTAL

The invention concerns a substance of diester type, i.e. an organic compound with three benzene nuclei connected by —COO— groups, exhibiting at least one mesomorphic phase of the smectic type.

The pure substance and mixtures of this substance with analogous compounds are elements of the invention, as well as the synthesis of the pure substance.

The organic compound of the invention answers to the general formula:

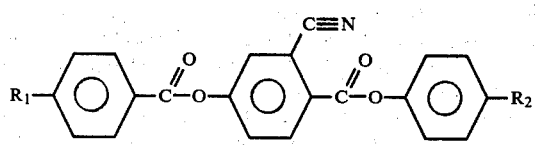

with $R_1 = C_nH_{2n+1}$ or $C_nH_{2n+1}O$, n being an integer from 1 to 10; and $R_2 = C_mH_{2m+1}$, m being an integer from 1 to 10.

The compound thus defined is referred to as: (n-alkoxy-4 benzoyloxy)-4 cyano-2 benzoate of n-alkyl-4 phenyl or (n-alkyl-4 benzoyloxy)-4 cyano-2 benzoate of n-alkyl-4 phenyl accordingly as $R_1$ is an alkoxy or alkyl radical.

The description which follows bears on the general synthesis procedure, the modus operandi of certain steps of this synthesis and the properties of a substance thus synthesized.

GENERAL SYNTHESIS PROCEDURE

Starting with a paraalkyl (or alkoxy) benzoic acid, then a hydroxy-4 chloro-2 benzoic acid, and finally an alkyl-4 phenol, one realizes successively the synthesis:

of a chloride of alkyl-4 benzoyl (reaction 1);

of a hydroxy-4 chloro-2 benzoate of alkyl phenyl (reaction 2);

of a hydroxy-4 cyano-2 benzoate of alkyl phenyl (reaction 3);

finally (reaction 4) of the compound of the invention with the products synthesized in reactions (1) and (3).

The reaction (1) is classic:

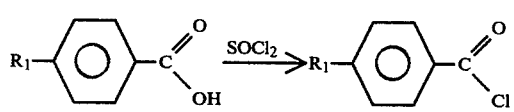

The reaction (2) takes place in toluene in the presence of sulfuric and boric acids, heated with reflux for about a hundred hours, according to the following scheme:

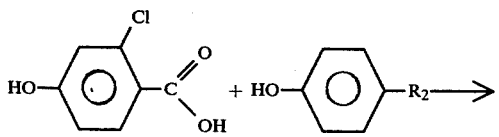

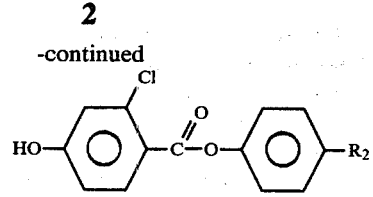

Reaction (3) takes place in a solution of cuprous cyanide and N-methyl pyrrolidone-2, heated with reflux for some hours, according to the following scheme:

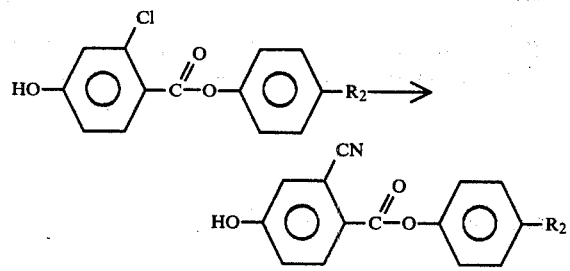

Reaction (4) takes place at ordinary temperatures in pyridine, according to the following scheme:

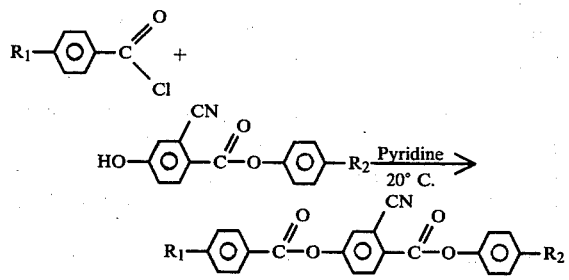

PROCEDURAL STEPS FOR REACTIONS (2) TO (4)

(a) Synthesis of hydroxy-4 chloro-2 benzoate of n-pentyl-4 phenyl:

To 600 ml of toluene are added 17.25 g (0.1 mole) of hydroxy-4 chloro-2 benzoic acid, 18 g (0.11 mole) of n-pentyl-4 phenol, 0.5 g of concentrated sulfuric acid and 0.3 g of boric acid. This is heated with reflux for 80 to 100 hours with decanting of the water formed in the course of the reaction. The toluene is then distilled off and the product recrystallized twice in an ethanol-water mixture. One obtains 20.7 g of pure product with a melting point of 150° C.

(b) Synthesis of hydroxy-4 cyano-2 benzoate of n-pentyl-4 phenyl:

To 20 ml of N-methyl pyrrolidone-2 are added 3.2 g (0.01 mole) of hydroxy-4 chloro-2 benzoate of n-pentyl-4 phenyl and 1.3 g of cuprous cyanide (0.014 mole). This is heated with reflux for 4 hours and the solution then poured into a mixture of 60 cc of deionized water and 4 cc of ethylene diamine. One next acidifies this solution with 3 N hydrochloric acid to a pH of 4. The solution is extracted with ether. The volatile extract is washed with deionized water and dried on sodium sulfate. The product is purified by chromatography on a silica column with elution by chloroform, then recrystallized in a hexane/benzene mixture. One obtains a pure product with a melting point of 182° C.

(c) Synthesis of (n-octyl-4 benzoyloxy)-4 cyano-2 benzoate of n-pentyl-4 phenyl:

In 2 ml of pyridine one dissolves 85 mg ($2.75 \times 10^{-4}$ mole) of hydroxy-4 cyano-2 benzoate of n-pentyl-4 phenyl. One then adds 75 mg ($3 \times 10^{-4}$ mole) of n-octyl-4 benzoyl chloride. The mixture is stirred at room temperature for 24 hours. One next pours the solution into a mixture of 10 g of ice and 1 cc of concentrated sulfuric acid. The crude product is extracted with benzene then purified by chromatography on a silica column and recrystallized in ethanol. One obtains 100 mg of pure product, or a yield of 70%.

Properties of the synthesized substance and of a mixture of this substance with a nematic liquid crystal:

The example chosen answers to the formula:

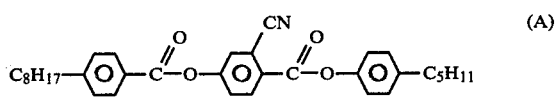

(A)

The substance (A) has a solid crystalline phase up to its first point of fusion at 75.5° C. It exhibits a first mesomorphic phase of the smectic type A over the following range in °C.: K 75.5 S$_A$ 111

It exhibits in addition a second mesomorphic phase of the nematic type over the following range in °C.: 111 N 115.5 I There will be considered a mixture (M) containing 10% in moles of the substance (A) and 90% of paramethoxybenzoate of parapentylphenol, designated hereafter as the substance (B), exhibiting a nematic phase from 29° C. to 42° C.

Measurements were made of the dielectric anisotropy at four different frequencies of the electric field prevailing in the liquid crystal, frequencies at intervals from 1 to 1000 kHz.

The tables below give the results of measurements carried out on the substance B (table 1) and the mixture M (table 2) under the following conditions:

temperature of 26° C.;

magnetic orientation field of 10,000 oersteds;

parallel dielectric constant $\epsilon_{11}$ and perpendicular dielectric constant $\epsilon_1$ measured at different frequencies N (kHz) of the electric field; the dielectric anisotropy $\epsilon_a$ is obtained from the formula:

$$\epsilon_a = \epsilon_{11} - \epsilon_1$$

TABLE 1

| N (kHz) | (substance B) $\xi_{11}$ | $\xi_1$ | $\xi_a$ |
|---|---|---|---|
| 1 | 4.9 | 4.8 | +0.1 |
| 10 | 4.9 | 4.8 | +0.1 |
| 100 | 4.8 | 4.8 | 0 |
| 1000 | 3.7 | 4.9 | −1.2 |

TABLE 2

| N (kHz) | (substance B) $\xi_{11}$ | $\xi_1$ | $\xi_a$ |
|---|---|---|---|
| 1 | 6.7 | 6.0 | +0.7 |
| 10 | 6.4 | 6.0 | +0.4 |
| 100 | 5.2 | 6.0 | −0.8 |
| 1000 | .42 | 6.1 | −1.9 |

It was found, as can be seen in Tables 1 and 2, that the dielectric anisotropy vanishes at the frequency called frequency of dielectric isotropy, of 100 kHz in the first case and a frequency between 10 and 100 kHz (actually 30 kHz) in the second case.

It is seen that the mixture has a lower relaxation frequency than substance B. One can conclude from this that the substance of the invention has a relatively low relaxation frequency.

A dielectric isotropy frequency of 30 kHz is distinctly lower than that of classic liquid crystals such as the biphenyls, in smectic phase, which is above 1 MHz.

The dielectric anisotropy of the substance of the invention, in the example chosen, changes from a large positive value at 1 kHz (of the order of +6) to a large negative value (of the order of −8) at 100 kHz. Quite generally the substance of the invention may be utilized in mixture with smectic liquid crystals to lower their relaxation frequency.

The invention is applicable to the fabrication of field-effect display devices with dual frequency memory.

We claim:

1. A liquid crystal of the diester type having the chemical formula

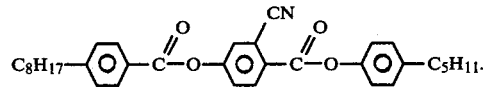

2. A liquid crystal composition comprising 10% in moles of the liquid crystal according to claim 1 and 90% in moles of paramethoxybenzoate of parapentyl phenol.

3. A display device containing a liquid crystal according to claim 1 or 2, characterized by the fact that it is of the field-effect type with dual frequency memory.

* * * * *